(12) United States Patent
Yoshida (10) Patent No.: US 7,230,732 B2
(45) Date of Patent: Jun. 12, 2007

(54) FACSIMILE APPARATUS, CONTROL METHOD OF FACSIMILE APPARATUS, AND COMPUTER-READABLE MEMORY MEDIUM STORING THEREIN CONTROL PROGRAM FOR FACSIMILE APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 09/865,697

(22) Filed: May 29, 2001

(65) Prior Publication Data

US 2002/0051243 A1 May 2, 2002

(30) Foreign Application Priority Data

May 29, 2000 (JP) .............................. 2000-157557

(51) Int. Cl.
*G06F 15/00* (2006.01)
*H04N 1/00* (2006.01)

(52) U.S. Cl. .................. 358/1.15; 358/408; 358/434; 358/438

(58) Field of Classification Search ................ 358/434, 358/439, 449, 297, 298, 468, 438, 435, 474, 358/1.15, 408
See application file for complete search history.

(56) References Cited

U.S. PATENT DOCUMENTS 4,870,501 A  9/1989 Yoshida ...................... 358/284
5,408,340 A * 4/1995 Edamura ..................... 358/468
5,535,015 A  7/1996 Yoshida ...................... 358/438
6,005,672 A  12/1999 Yoshida ...................... 358/434

FOREIGN PATENT DOCUMENTS

JP  11-17877  * 1/1999

* cited by examiner

*Primary Examiner*—Thomas D. Lee
*Assistant Examiner*—Houshang Safaipour
(74) *Attorney, Agent, or Firm*—Fitzpatrick, Cella, Harper & Scinto (57) ABSTRACT

A one-side or both-side transmission mode is properly automatically selected in accordance with an original, thereby enabling desired image communication of the user to be properly executed. A CPU discriminates whether effective image data is included on both sides of an original image read by a reading circuit or not. If at least one sheet of original in which the effective image data is included on both sides exists, a both-side transmission of the image data read from both sides of the original is executed, and in the other cases a one-side transmission of the image data read from the front side of the original is executed. When a compulsory front side reading mode is selected by the operation of an operation unit, even if at least one sheet of original in which the effective image data is included on both sides exists, only the front side of the original is read and the read image data is transmitted in the one-side mode.

9 Claims, 10 Drawing Sheets

| BIT NO. | DIS/DTC | DCS |
|---|---|---|
| X | PRESENCE/ABSENCE OF BOTH-SIDE RECORDING FUNCTION (ALTERNATION MODE) | BOTH-SIDE TRANSMISSION (ALTERNATION MODE) |
| X+1 | PRESENCE/ABSENCE OF BOTH-SIDE RECORDING FUNCTION (CONTINUATION MODE) | BOTH-SIDE TRANSMISSION (CONTINUATION MODE) |

FIG. 3

| FLAG | ADDRESS | CONTROL | FCF | PC | BC | FC | LENGTH | PAGE NUMBER | PAGE INFORMATION | FCS | FLAG |
|---|---|---|---|---|---|---|---|---|---|---|---|

ECM ONLY (PC, BC, FC)

FACSIMILE APPARATUS, CONTROL METHOD OF FACSIMILE APPARATUS, AND COMPUTER-READABLE MEMORY MEDIUM STORING THEREIN CONTROL PROGRAM FOR FACSIMILE APPARATUS

BACKGROUND OF THE INVENTION

1. Field of the Invention

The invention relates to a facsimile apparatus for reading and transmitting both-side information, a control method of such a facsimile apparatus, and a computer-readable memory medium in which a control program for the facsimile apparatus has been stored.

2. Related Background Art

The facsimile apparatus specified in the ITU-T recommendation T4, T30, or the like fundamentally has a construction such that information of a one-side original is transmitted. That is, the original on the transmitter side relates to the one-side information and the received image data is recorded onto one side of a recording paper on the receiver side.

In recent years, the consciousness regarding the realization of the saving of resources has been being increased. In printers, copying apparatuses, and the like, the number of apparatuses having what is called a both-side recording system for recording image data onto both front and reverse sides of one sheet of paper is increasing. In association with it, in recent years, even in a facsimile apparatus, a hardware construction and a communicating procedure for reading and transmitting both-side original have been proposed.

As a transmitting system of both-side image data, there has been known a both-side alternation transmission in which an image on the front side of an original and an image on the reverse side are alternately transmitted with respect to each page, a both-side continuation transmission in which the whole image on the front side of an original is transmitted and, subsequently, all of the image on the reverse side is transmitted, or the like.

In the ITU-T recommendation T30 or its tentative plan, a communicating procedure regarding the both-side transmission has been proposed. According to the system proposed in the recommendation, the image data itself of one side of the front or reverse side of the original is transmitted as a facsimile message that is almost similar to the image of one page which is obtained in case of the conventional one-side transmission and information such as page number and side is added to a post message signal, and they are transmitted.

Functions of the transmitter and receiver regarding the both-side transmission are notified by a DCS signal or a DIS signal. Functions regarding the both-side recording of the receiver are notified by a DIS signal.

In the conventional facsimile apparatus for performing the both-side transmission, either a mode for performing the both-side transmission or a mode for performing the one-side transmission has been determined by a specific communication mode designating operation of the user. For example, since it is not practical to permanently set the communication mode to a both-side transmission mode, it is a general way to set a default mode to a one-side transmission mode and set the both-side transmission mode every communication by a specific operation as necessary.

However, it is very troublesome to execute the operation for performing the setting operation to set whether an original is a both-side original or not or the operation for specifically setting the both-side transmission mode every communication.

If the one-side or both-side mode is erroneously set, there is a problem such that a transmission different from the transmission which the user inherently wants to perform is executed. In other words, there occurs a problem such that in spite of a fact that the original is the both-side original, if the user forgets to designate the both-side transmission mode, the one-side transmission is executed, so that information on the reverse side to be inherently transmitted cannot be transferred to the reception side. On the contrary, a problem such that if information of a one-side original is transmitted in the both-side transmission mode, information of a white paper on the reverse side is wastefully transmitted.

SUMMARY OF THE INVENTION

It is an object of the invention to solve the above problems and to realize a construction such that a one-side or both-side transmission mode can be automatically selected without needing any troublesome operations, wasteful communication is prevented, the one-side or both-side transmission mode can be properly selected in accordance with an original, and image communication which the user desires can be properly executed.

DETAILED DESCRIPTION OF THE PREFERRED EMBODIMENT

The invention will now be described in detail hereinbelow on the basis of an embodiment shown in the drawings.

Figure 1:
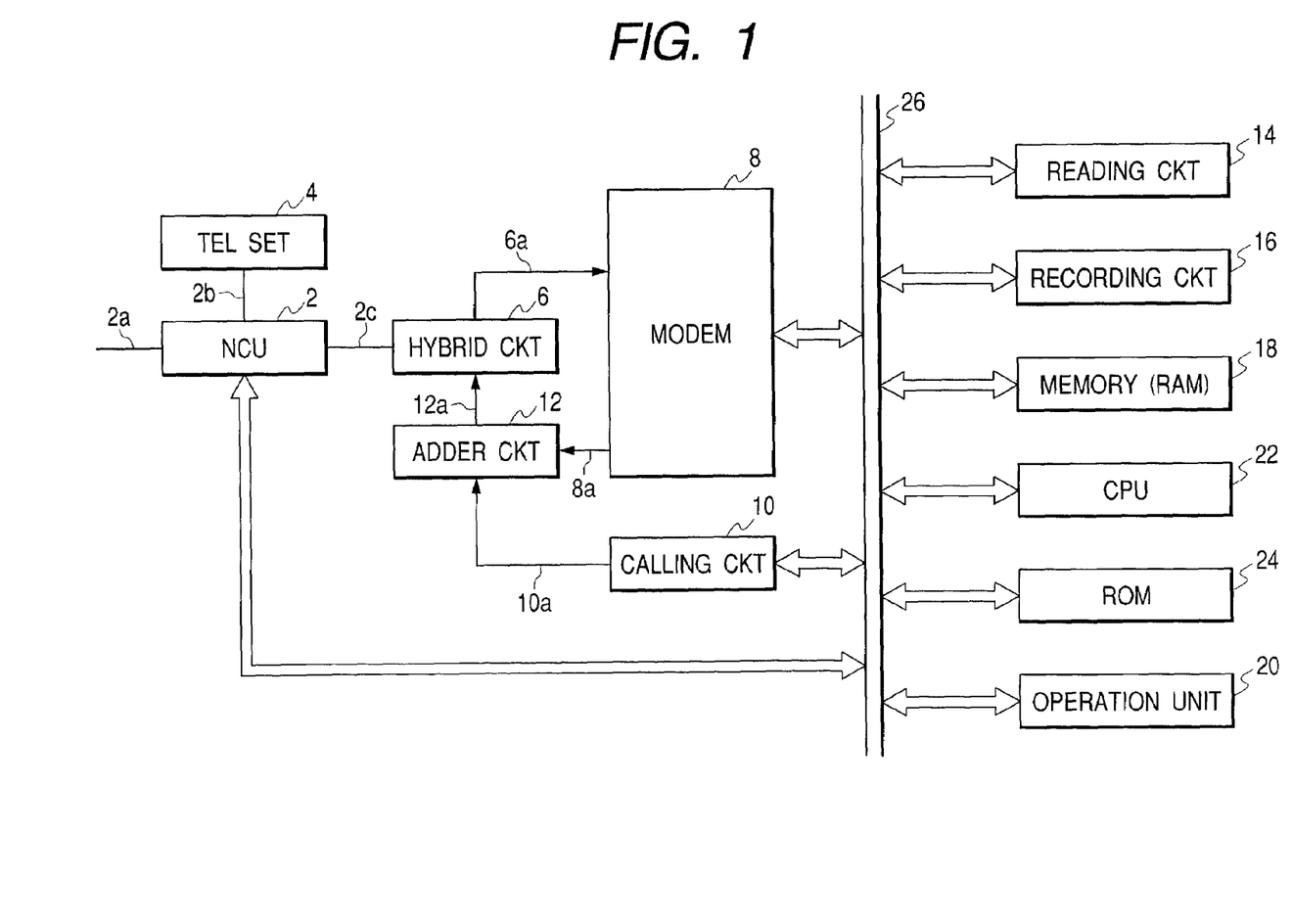
FIG. 1 is a block diagram showing a hardware construction of a facsimile apparatus using the invention.

FIG. 1 shows a hardware construction of a facsimile apparatus using the invention. In FIG. 1, reference numeral 2 denotes an NCU (network control unit) for connecting a telephone network to terminals of its line in order to use the telephone network for the purpose of data communication or the like, controlling the connection of a telephone exchange network, switching to a data communication path, and holding a loop. The NCU 2 connects a telephone line 2a to a telephone set 4 side (CML is OFF) or connects the telephone line 2a to the facsimile apparatus side (CML is ON) in accordance with a control from a bus 26. In a normal state, the telephone line 2a is connected to the telephone set 4 side.

Reference numeral 6 denotes a hybrid circuit for separating a signal of a transmission system and a signal of a reception system, sending a transmission signal from an adder circuit 12 to the telephone line 2a via the NCU 2, receiving a signal from a partner side via the NCU 2, and sending it to a modem 8 through a signal line 6a.

Reference numeral 8 denotes the modem for performing a modulation and a demodulation based on the ITU-T recommendation V.8, V.21, V.27ter, V.29, V.17, and V.34. Each transmission mode is designated by the control of the bus 26. The modem 8 receives the transmission signal from the bus 26, outputs modulation data to a signal line 8a, receives a reception signal outputted to the signal line 6a, and outputs demodulation data to the bus 26.

Reference numeral 10 denotes a calling circuit for receiving telephone number information in accordance with the control from the bus 26 and outputting a selection signal of DTMF to a signal line 10a.

Reference numeral 12 denotes the adder circuit for adding the transmission signal, receiving information on the signal line 8a and information on the signal line 10a, and outputting an addition result to a signal line 12a.

Reference numerals 14 and 16 denote circuits of an image reading and recording systems. In order to cope with the both-side transmission, these circuits can read both front and reverse sides of the original and record image data onto both front and reverse sides of a recording paper.

That is, reference numeral 14 denotes the reading circuit which comprises an original conveying system, an optical reading device, and the like and outputs the image data read from the original to the bus 26. It is assumed that the reading circuit 14 can read the image data on the reverse side of the original by a method whereby the original is reversed by a built-in original reversing mechanism, or the like.

In the embodiment, with respect to the reverse side of the original, the whole image is read and the transmission control is changed by discriminating whether effective information is included in the read image or not as will be explained hereinlater.

Reference numeral 16 denotes the recording circuit based on a predetermined recording system such as electrophotographic system, ink jet system, or the like. The recording circuit sequentially records the information outputted onto the bus 26 line by line. Whether the recording circuit 16 records the image data onto the front side of the recording paper or it records the image data onto the reverse side, can be controlled through the bus 26.

Reference numeral 18 denotes a memory which comprises an arbitrary memory device such as ROM, RAM, hard disk, or the like and is used for storing various data. For example, the memory 18 is used for allocating a flag and a counter used as a work memory, used for storing raw (or non-coded) information of the read data or encoded information thereof, or used for storing received information, decoded information, or the like.

A memory area for registering information regarding whether a compulsory front side reading operation is executed or not is provided in the memory 18. Whether the compulsory front side reading operation is executed or not can be set and registered by a predetermined operation of an operation unit 20.

Reference numeral 20 denotes the operation unit having a keyboard. A one-touch dial, an abbreviation dial, a ten-key, a * key, a # key, a set key, a start key, a stop key, and other function keys are provided for the keyboard. Operation information of those keys is outputted to a CPU 22 through the bus 26. A display unit comprising an LCD panel or the like is provided for the operation unit 20, receives the information outputted onto the bus 26, and displays it.

Reference numeral 22 denotes the CPU (central processing unit) for controlling the whole facsimile apparatus and executing a facsimile transmission control procedure. The control procedure of the invention is stored as a control program of the CPU 22 into an ROM 24.

An outline of a communication procedure for both-side transmitting image data of a both-side original will now be described with reference to FIGS. 2 to 7. The general both-side transmission disclosed in the tentative plan of the ITU-T recommendation T30 proposed at present is shown here.

As communication modes of the both-side transmission, two modes, an alternation mode (both-side alternation transmission mode) and a continuation mode (both-side continuation transmission mode) exist. The former mode is a mode for alternately transmitting the front and reverse sides for each page (or sheet) of the original one page by one in order from first the front and reverse sides of the first page, second the front and reverse sides of the second page, and so on. The latter mode is a mode for first transmitting only all of the front sides of pages (or sheets) of the original in page order from first the front side of the first page, second the front side of the second page, and so on and, thereafter, transmitting all of the reverse sides of pages of the original in page order from first the reverse side of the first page, second the reverse side of the second page, and so on. The facsimile apparatus can use either of those two modes in accordance with the specification of the product and the operation mode.

Figure 2:
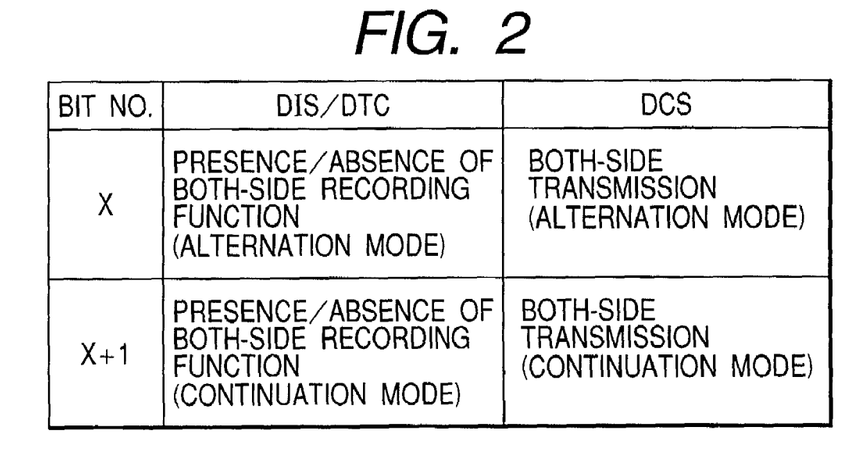
FIG. 2 is a table showing FIF of DIS/DTC and DCS signals which are used in a both-side transmission.

FIG. 2 shows, in a table format, a construction of information for designating the both-side transmission in an FIF (facsimile information field) of each signal of a DIS (digital identification: it is transmitted from an image receiving station), a DTC (digital transmission command: it is transmitted from an image transmitting station), and a DCS (digital command: it is transmitted from the image transmitting station).

As shown in FIG. 2, in the DIS/DTC signals, the presence or absence of the both-side recording function in the alternation mode is shown by the x-th bit (since this bit number is not legally determined, it is shown by "x" for convenience of explanation) of the FIF, and the presence or absence of the both-side recording function in the continuation mode is shown by the (x+1)th bit of the FIF. In the DCS signal, the both-side transmission in the alternation mode is designated by the x-th bit of the FIF, and the both-side transmission in the continuation mode is designated by the (x+1)th bit of the FIF.

Information of resolution which can be transmitted and received can be exchanged by the DCS/DIS signals irrespective of the both-side reception/one-side reception. Although not shown in FIG. 2, for example, bit 17 and bit 33 and subsequent bits of the DCS/DIS signals are used as information of the resolution which can be transmitted and received.

Figure 3:
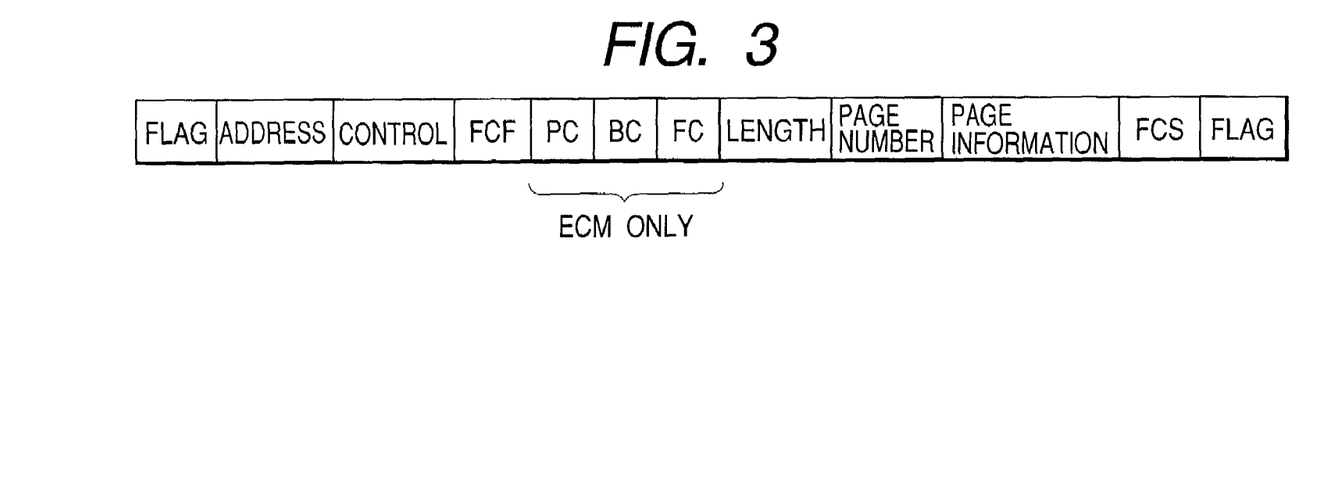
FIG. 3 is an explanatory diagram showing a format of a post message signal which is used in the both-side transmission.

FIG. 3 shows a frame construction of a Q signal (specifically speaking, an EOP (end of page) signal, an MPS (multi-page) signal, an EOM (end of message) signal, or the like) in the normal G3 transmission and a PPS-Q signal (specifically speaking, a post message signal such as PPS- EOP, PPS-MPS, PPS-EOM, PPS-NULL, or the like) in the ECM (error correction mode) transmission.

As shown in FIG. 3, in those post message signals, facsimile information is transmitted subsequently to Flag (flag), Address (address), Control (control data), and FCF (facsimile control field). At the head of the facsimile information, three fields of PC (page counter), BC (block counter), and FC (frame counter) are transmitted only in case of the ECM, and after that, the facsimile information regarding the both-side transmission follows. As for the facsimile information regarding the both-side transmission, Length (length: data size (unit of the number of octets) of the relevant page; a data width of this field is equal to 1 octet), Page number (page number: 2 octets), and Page information (page information) follow, and after that, FCS (frame check sequence) and Flag (flag) follow.

Among them, Page number (page number) is added one page by one from page P1 every side of front and reverse when the both-side original is transmitted in the order of pages from the front side and the reverse side on the basis of the regulations. Page information (page information) has a data width of 1 octet and indicates whether the image data of the side relates to the front side or the reverse side. The front side (0) or the reverse side (1) is expressed by bit 0. Bit 1 to bit 6 are reservation bits and their functions are not defined. Bit 7 is always set to 0 as an expansion bit.

In the facsimile information of the post message signals, three information of Length, Page number, and Page information corresponds to fields which are newly added for both-side transmission.

Figure 4:
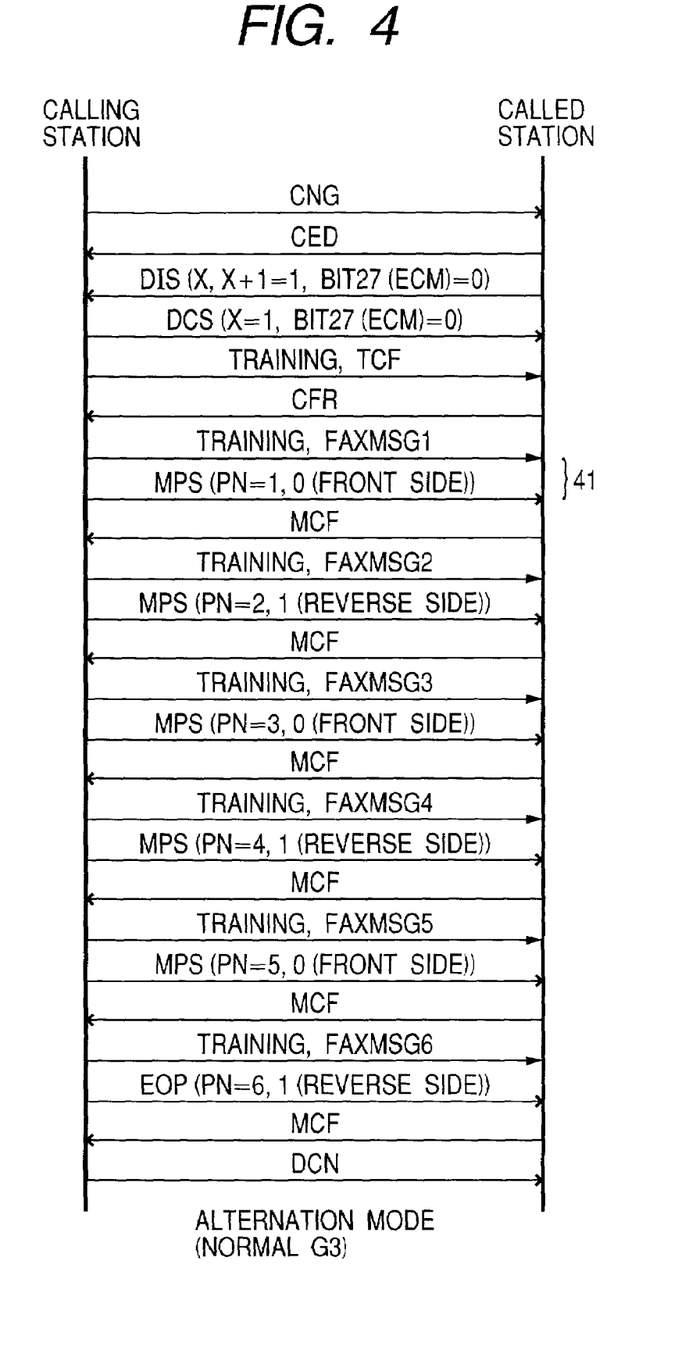
FIG. 4 is an explanatory diagram showing a state of the both-side transmission in an alternation mode in a non-ECM communication mode.
Figure 5:
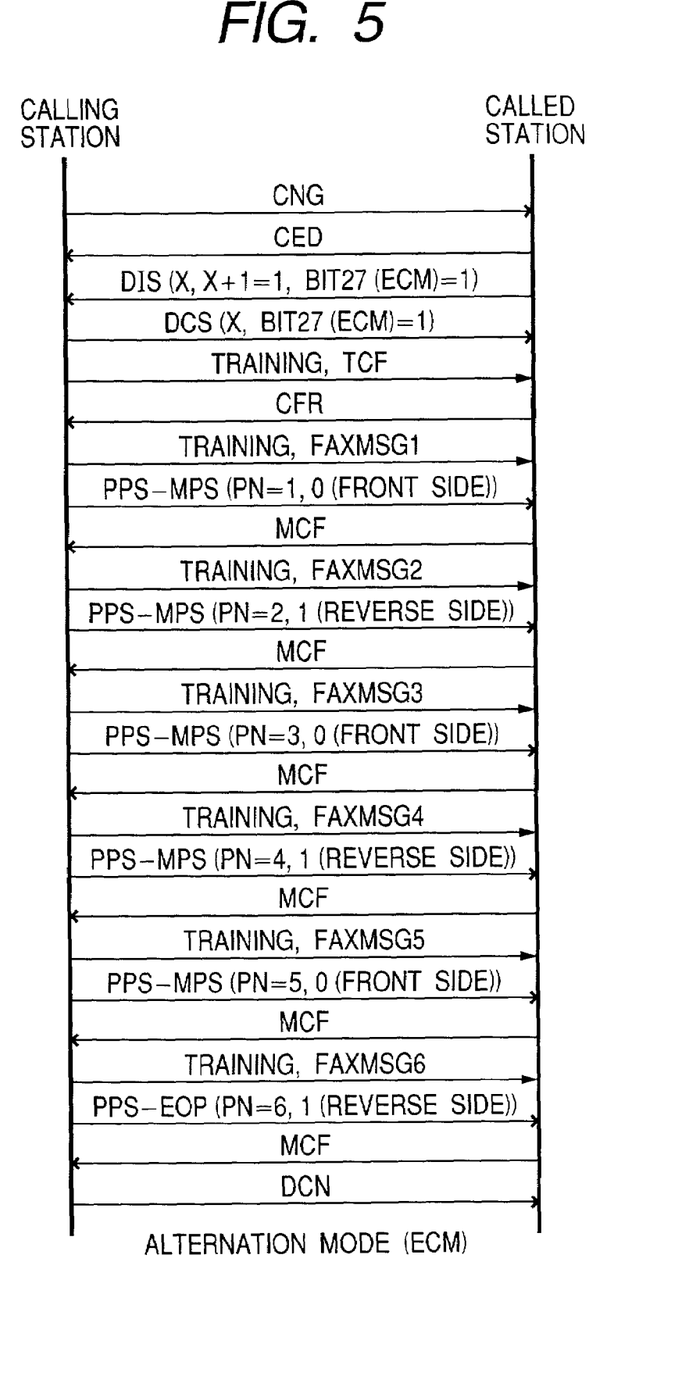
FIG. 5 is an explanatory diagram showing a state of the both-side transmission in an alternation mode in an ECM communication mode.
Figure 6:
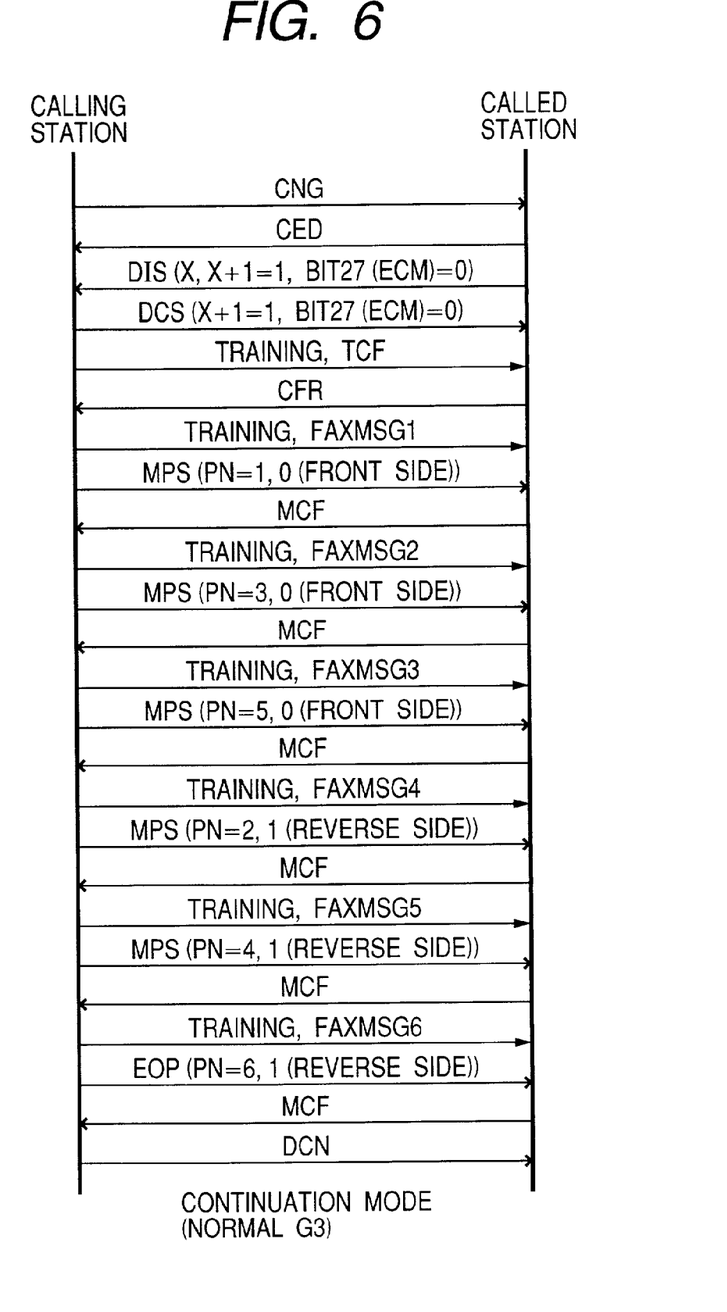
FIG. 6 is an explanatory diagram showing a state of the both-side transmission in a continuation mode in the non-ECM communication mode.
Figure 7:
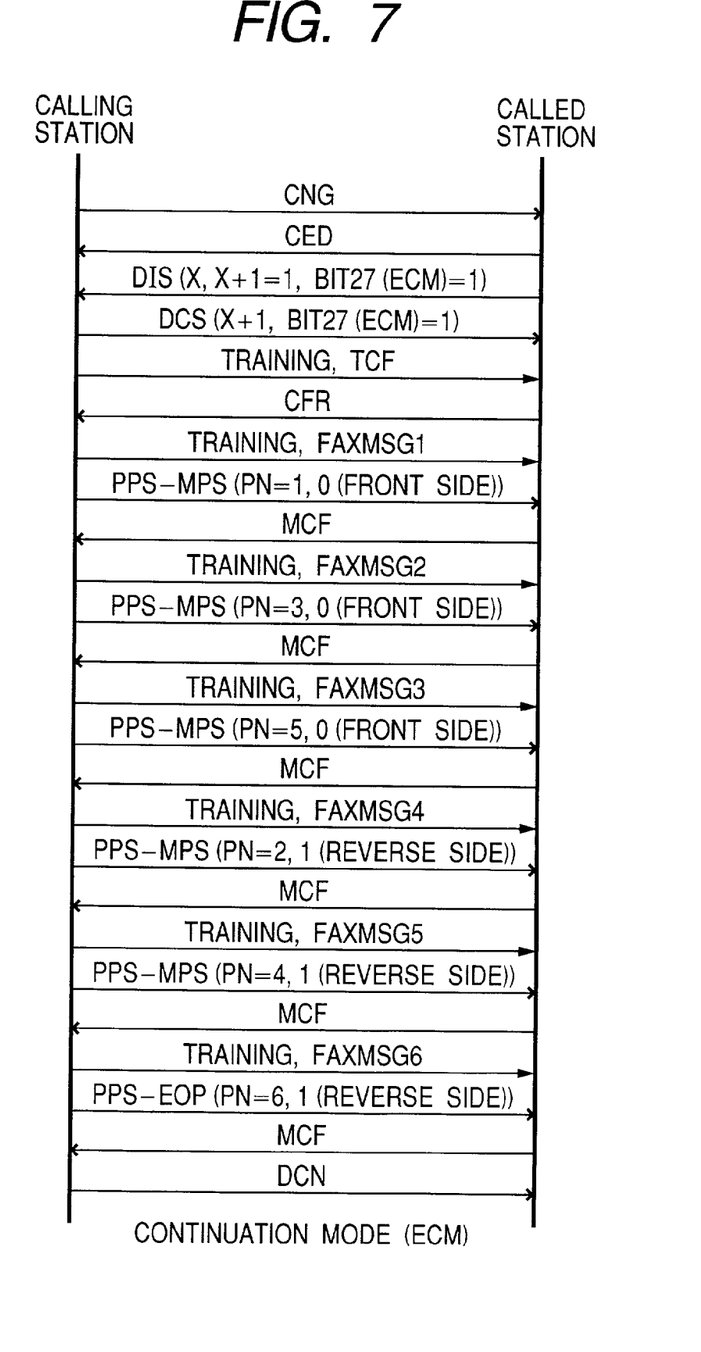
FIG. 7 is an explanatory diagram showing a state of the both-side transmission in the continuation mode in the ECM communication mode.

FIG. 4 shows a state of the both-side transmission in the alternation mode in the normal G3 mode. FIG. 5 shows a state of the both-side transmission in the alternation mode in the ECM communication mode. FIG. 6 shows a state of the both-side transmission in the continuation mode in the normal G3 mode. FIG. 7 shows a state of the both-side transmission in the continuation mode in the ECM communication mode.

As shown in FIGS. 4 to 7, the both-side transmitting function (which is possible in both alternation and continuation modes) of the receiver is shown by the x-th bit and (x+1)th bit of the DIS signal, and the both-side transmission mode to be executed from now on by the transmitter is declared by the x-th bit and (x+1)th bit of the DCS signal. In the continuation mode in FIGS. 6 and 7, it is declared that the transmission in the continuation mode is executed by setting the (x+1)th bit of the DCS signal to "1".

As shown in FIGS. 4 and 6, in case of the normal mode, the MPS signal is used as a post message signal. As shown in FIGS. 5 and 7, in case of the ECM, the PPS-MPS signal is used as a post message signal.

Three both-side originals are transmitted and "PN" in each diagram shows the Page number.

For example, although an MPS signal shown at 41 in FIG. 4 (alternation mode) is shown as "MPS (PN=1, 0 (front side))", it means that the image data of Page number 1 (PN=1) and Front (0 (front side)) has been transmitted (the expression of the MPS or PPS-MPS signal in FIG. 4 and subsequent diagrams have substantially the same meaning as that mentioned above).

That is, in the alternation mode in FIGS. 4 and 5, the image data of the originals is transmitted in order from Front (0) of the first page (PN=1), Reverse (1) of the first page (PN=2), Front (0) of the second page (PN=3), Reverse (1) of the second page (PN=4), Front (0) of the third page (PN=5), and Reverse (1) of the third page (PN=6).

In the continuation mode in FIGS. 6 and 7, the image data of the originals is transmitted in order from Front (0) of the first page (PN=1), Front (0) of the second page (PN=3), Front (0) of the third page (PN=5), Reverse (1) of the first page (PN=2), Reverse (1) of the second page (PN=4), and Reverse (1) of the third page (PN=6).

The general both-side transmission procedure has been described above. In the invention, the front side of the original information and the reverse side of the original information are read, in accordance with states of the images on both sides of the original, particularly, in accordance with whether the effective image exists on the reverse side or not, the both-side transmission is executed if the both-side original information of at least one page exists in the transmission original information, on the other hand, when the image exists only on the front side of the transmission original, the both-side transmission is not executed but the one-side transmission is executed. In accordance with the selecting state of the compulsory front side reading mode, if the compulsory front side reading mode is selected, even if the information exists on the reverse side, the both-side transmission is not executed but the one-side transmission is executed.

FIGS. 8 to 11 show flowcharts for a flow of the foregoing communication control. It is assumed that the portions of the same numbers in FIGS. 8 to 11 are continuous at each position.

Figure 8:
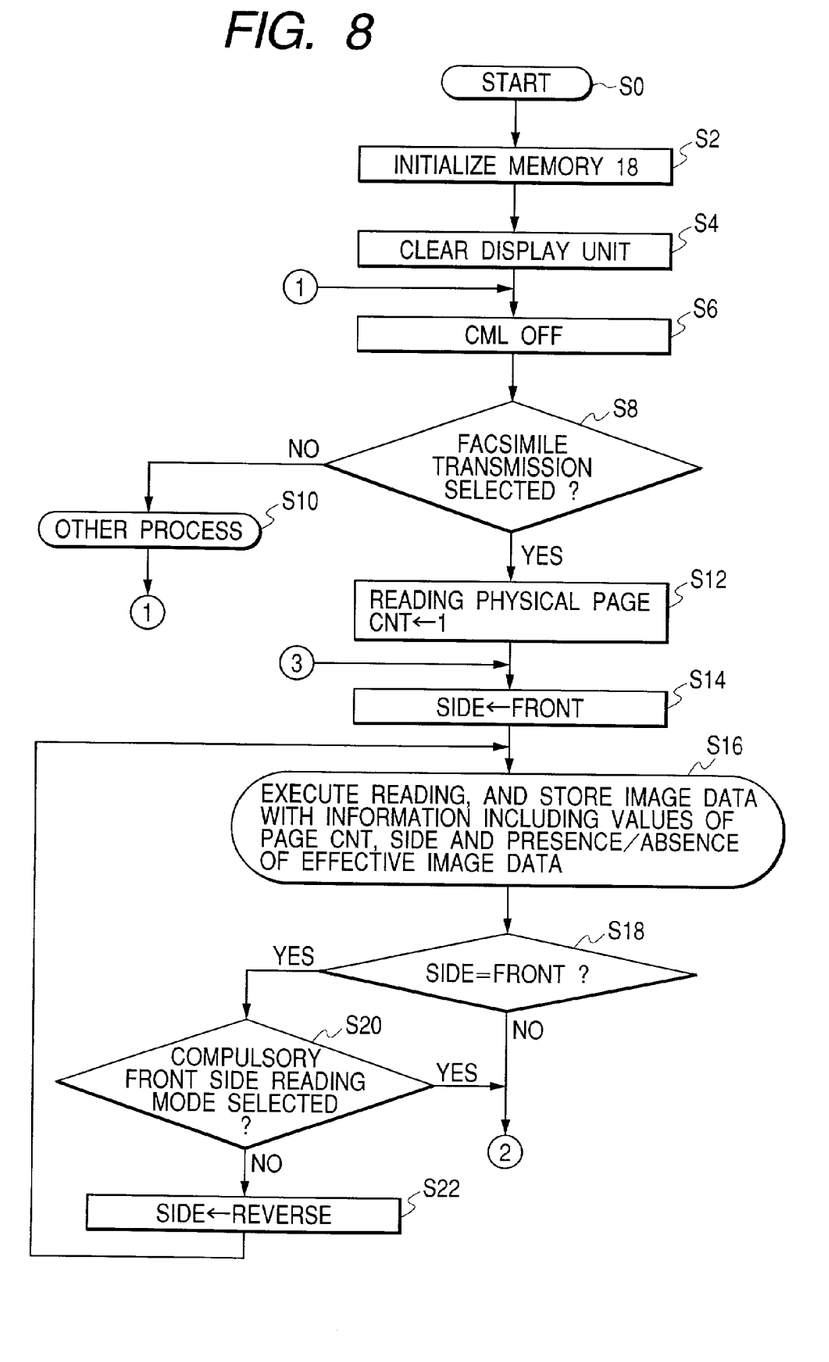
FIG. 8 is a flowchart showing a communication control of a CPU 22 in FIG. 1.

In FIG. 8, step S0 shows a start of processes which are started by a predetermined resetting operation or the like.

In step S2, the memory 18 is initialized through the bus 26. In step S4, the display unit of the operation unit is cleared through the bus 26.

In step S6, the CML of the NCU 2 is turned off through the bus 26 and the line 2a is connected to the telephone set 4 side.

In step S8, the information of the operation unit 20 is inputted through the bus 26 and whether the facsimile transmission has been selected or not is discriminated. If the facsimile transmission is selected, step S12 follows. If the facsimile transmission is not selected, step S10 follows and the other process (copy of the original, or the like) is executed.

In step S12, "1" is set into a reading physical page counter. In step S14, "front" is set to the side. It is assumed that the reading physical page counter is allocated to a predetermined area or the like in the memory 18.

In step S16, the image is read out by the reading circuit 14. The images on both sides of the original are read and stored into an image memory allocated to a predetermined area or the like in the memory 18. A count value of the reading physical page counter in this instance and side information indicating whether the image is the image on the front side or the image on the reverse side are stored into a management information area in association with the image data.

In step S16, information indicative of the presence or absence of effective image data on the reading side of the original is also stored into the management information area. The effective image data can be detected by, for example, a method whereby if the reading side is in a all-white state (or a state where an occupation ratio of black dots is equal to or less than a predetermined percentage, or the like), it is determined that there is no effective image data. Although this method is the simplest method, it is also possible to further add proper detecting conditions in order to detect the effective image data and make a more strict discrimination.

In step S18, whether the side of the original which is at present being processed is the front side or not is discriminated. If YES in step S18, step S20 follows. If NO, the processing routine advances to step S24 in FIG. 9. The discrimination about the side of the original which is at present being processed is made by a side flag allocated to a predetermined area or the like in the memory 18.

In step S20, the information of the operation unit 20 is inputted through the bus 26 and whether a compulsory front side reading mode has been selected or not is discriminated. If the compulsory front side reading mode is selected, step S24 follows. If the compulsory front side reading mode is not selected, step S22 follows and the reverse side is set into the side flag.

Only in the first image reading loop (up to step S26, which will be explained hereinlater), the selecting state of the compulsory front side reading mode is discriminated by the setting state read and stored from the operation unit. It is assumed that in the second and subsequent image reading loops, however, it is discriminated by information indicative of the selecting state stored in the predetermined area in the memory 18. It is also assumed that also in a discrimination in step S32, which will be explained hereinlater, the selecting state of the compulsory front side reading mode is discriminated by the information indicative of the selecting state stored in the predetermined area in the memory 18.

That is, in the embodiment, although the compulsory front side reading mode should be set as a transmission mode by the user every transmission, naturally, it is also possible to consider a construction such that this mode can be semipermanently (until the next setting registration is executed) registered into the predetermined area in the memory 18 (that is, there is no need to select it every transmission).

Figure 9:
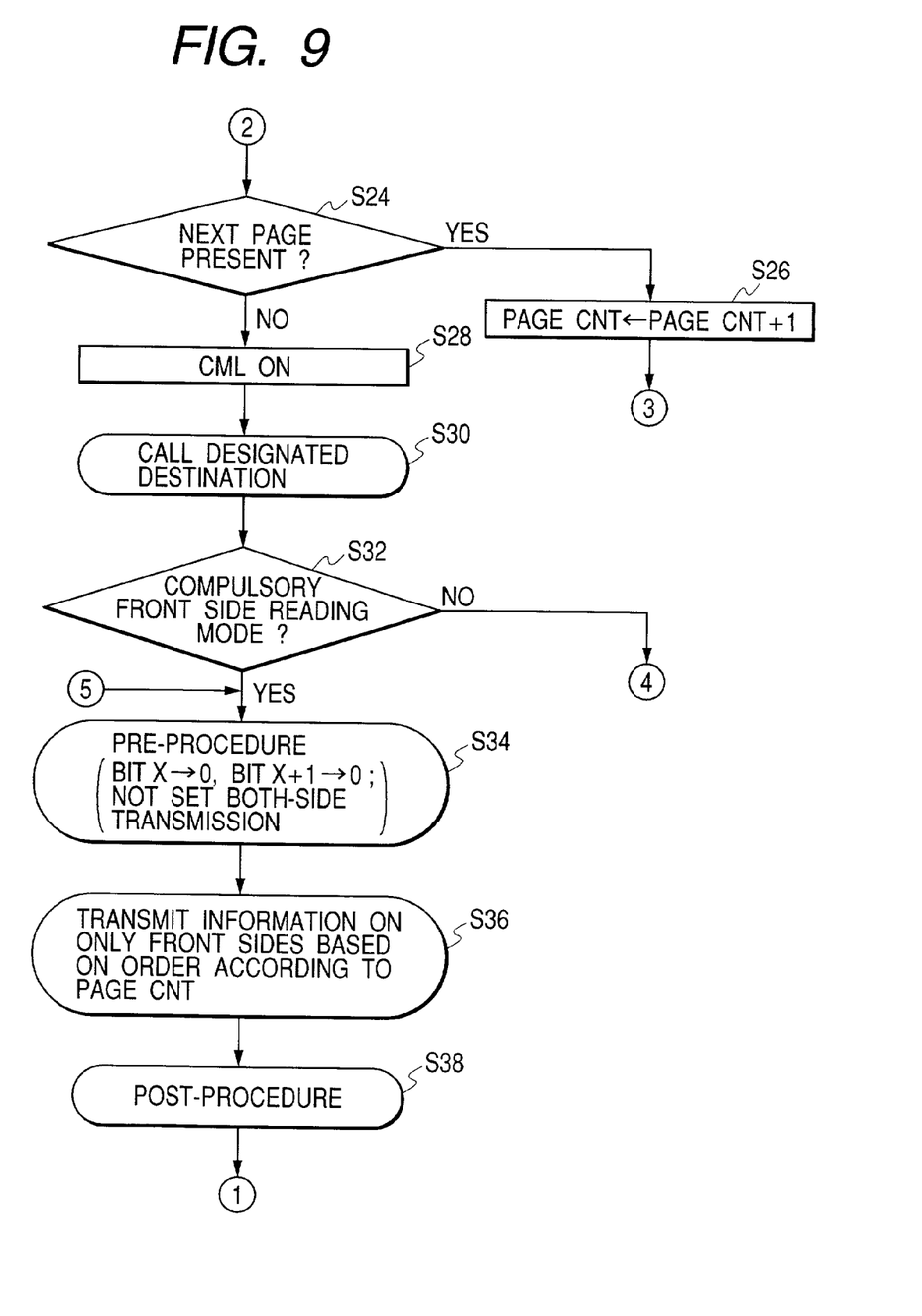
FIG. 9 is a flowchart showing the communication control of the CPU 22 in FIG. 1.

In step S24 in FIG. 9, the presence or absence of the next page to be read is discriminated. If there is the next page to be read, step S26 follows. A count value of the reading physical page counter is increased by "1". If there is not the next page, step S28 follows.

In step S28, the CML of the NCU 2 is turned on through the bus 26 and the telephone line 2a is connected to the facsimile apparatus side.

In step S30, a designated destination is called through the bus 26 by using the calling circuit 10.

In step S32, whether the compulsory front side reading mode has been selected or not is discriminated on the basis of the information stored upon discrimination in step S20. If the compulsory front side reading mode is selected, step S34 follows. If the compulsory front side reading mode is not selected, step S40 in FIG. 10 follows.

In step S34, a facsimile pre-procedure is executed. Both of the x-th bit and the (x+1)th bit of the FIF of the DCS signal are set to "0" and the both-side transmission is not designated.

In step S36, only the front side information stored in the image memory area in the memory 18 is sequentially transmitted on the basis of the count value of the reading physical page counter. The facsimile post-procedure is executed in step S38. After that, the processing routine is returned to step S6 in FIG. 8.

Figure 10:
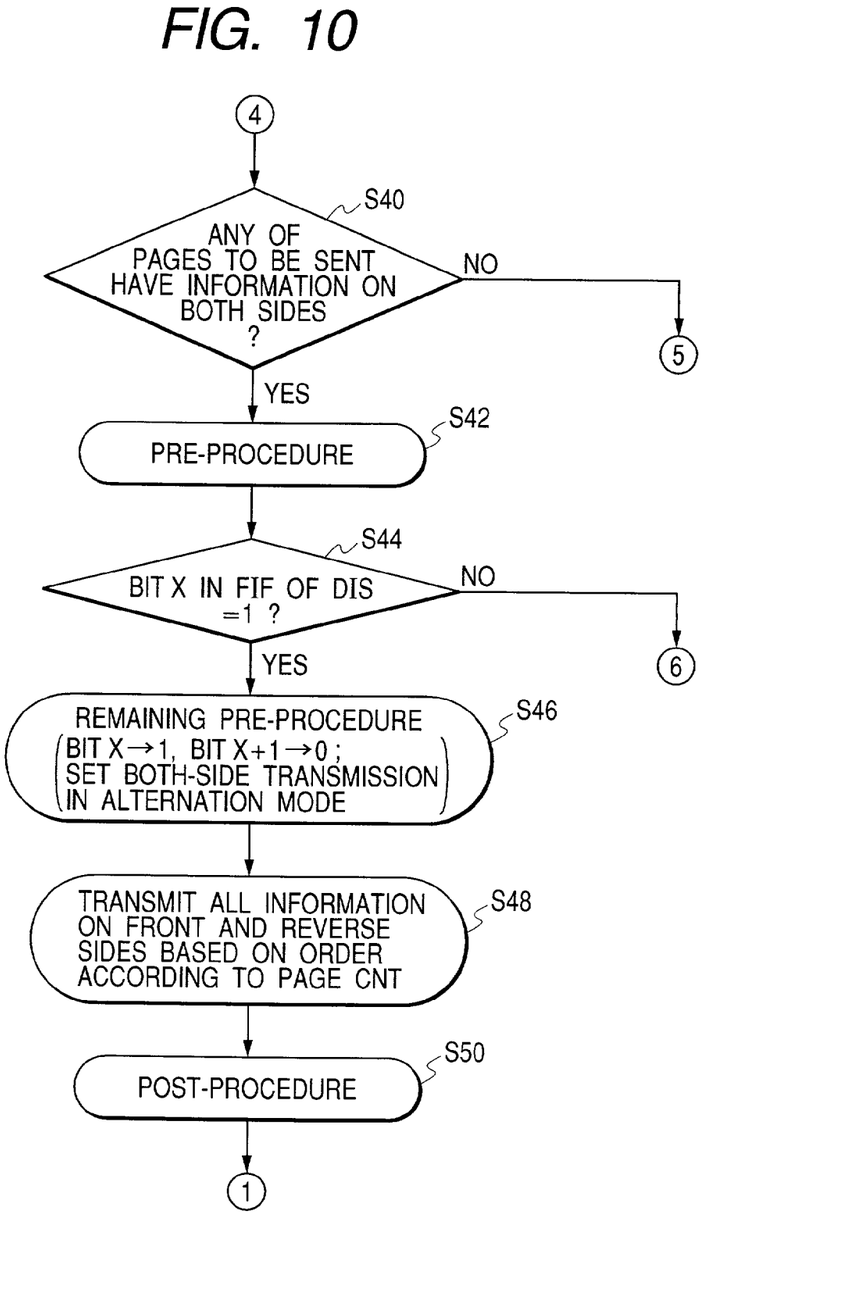
FIG. 10 is a flowchart showing the communication control of the CPU 22 in FIG. 1.

If the compulsory front side reading mode is not selected in step S32, in step S40 in FIG. 10, whether the both-side information of at least one page exists in the transmission original or not is discriminated on the basis of each of the management information stored in the management information area in step S16. The discrimination about the presence or absence of the both-side information is made by checking whether the effective image data exists on the reverse side of the original or not. If the both-side image data of at least one page exists in the transmission original, step S42 follows. If the both-side image data of at least one page does not exist in the transmission original, step S34 follows.

In step S42, the facsimile pre-procedure is executed. In step S44, whether the x-th bit of the FIF of the DIS signal transmitted from the receiver is equal to "1" or not, that is, whether there is the both-side receiving function in the alternation mode or not is discriminated. If the receiver has the both-side receiving function, step S46 follows. If the receiver does not have the both-side receiving function, the processing routine advances to step S52 in FIG. 11.

The remaining facsimile pre-procedure is executed in step S46. The x-th bit of the FIF of the DCS signal which is transmitted to the receiver is set to "1" and the (x+1)th bit is set to "0" here and the both-side transmission in the alternation mode is designated.

In step S48, all of the information on the front and reverse sides is sequentially transmitted on the basis of the count value of the reading physical page counter. A facsimile post-procedure is executed in step S50. After that, the processing routine is returned to step S6 in FIG. 8.

Figure 11:
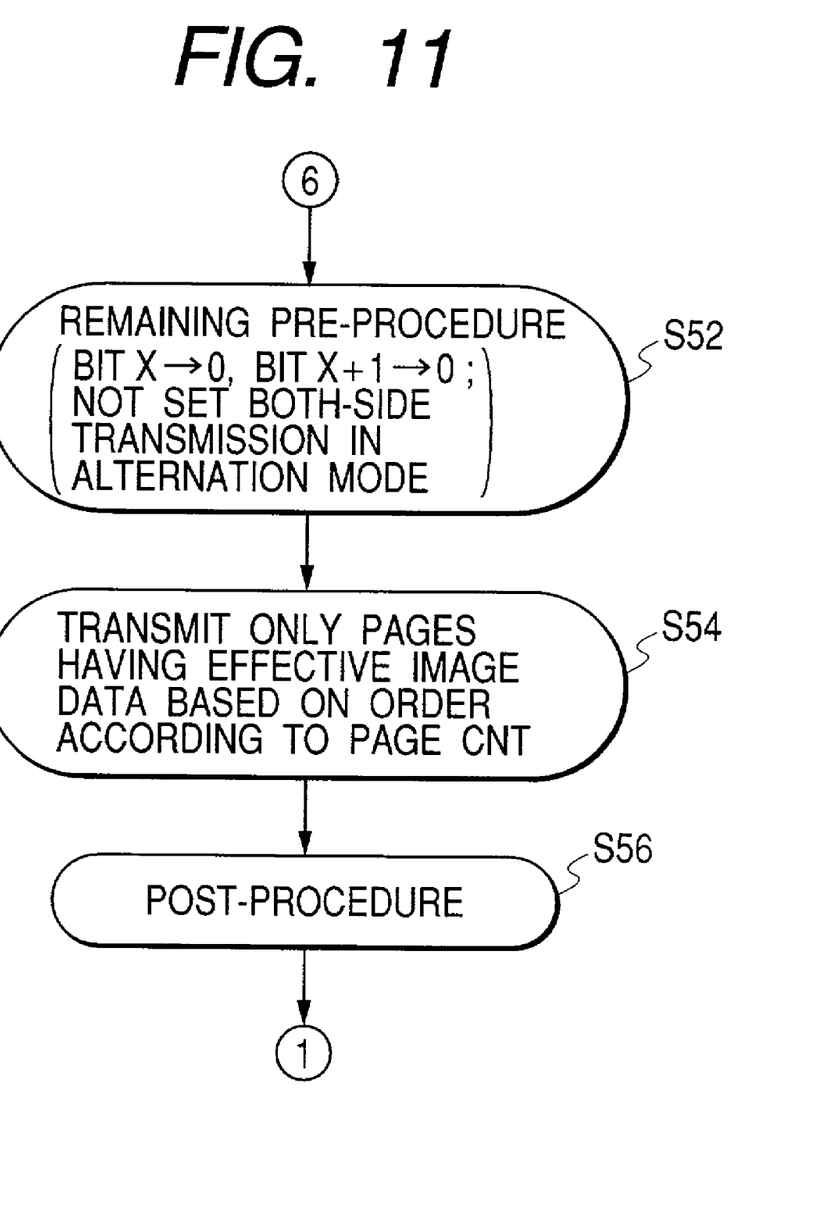
FIG. 11 is a flowchart showing the communication control of the CPU 22 in FIG. 1.

If the receiver does not have the both-side receiving function in step S44, the remaining facsimile pre-procedure is executed in step S52 in FIG. 11. Both of the x-th bit and the (x+1)th bit of the FIF of the DCS signal which is transmitted to the receiver are set to "0" here and the both-side transmission is not designated.

In step S54, only the sides including the effective image data are sequentially transmitted in order from the front side and the reverse side on the basis of the count value of the reading physical page counter. In step S56, the facsimile post-procedure is executed. The processing routine is returned to step S6 in FIG. 8. The image data on the front and reverse sides which was transmitted here is sequentially recorded as one-side information in the receiver.

According to the embodiment as mentioned above, if at least one sheet of original in which the effective image data is included on both sides exists, the both-side transmission of the image data read out from both sides of the original is executed. In the other cases, the one-side transmission of the image data read out from the front side of the original is executed. Therefore, the following excellent effects are obtained. That is, it is unnecessary that the user pays attention to a result of the discrimination about the both-side original or the one-side original. The troublesome operation to set the both-side/one-side transmission mode is unnecessary. Merely by setting the original and executing the transmitting operation, the proper both-side or one-side transmission mode can be automatically selected, the proper image data can be certainly transmitted, and the failure in transmission can be prevented.

It is possible to prevent the problem as in the conventional techniques from occurring: that is, the problem such that since the user forgets to designate the one-side/both-side transmission mode and the one-side transmission is executed, the information on the reverse side to be transmitted cannot be transferred to the reception side or, contrarily, the image data of the one-side original is transmitted in the both-side mode, so that the information of the white paper on the reverse side is wastefully transmitted, or the like.

When the compulsory front side reading mode has been selected, even if at least one sheet of original in which the effective image data is included on both sides exists, only the front side of the original is read out and the read image data is transmitted in the one-side mode. Therefore, it is possible to communicate with a receiver which cannot execute the both-side transmission without any problems.

There is also an excellent effect as below mentioned. The compulsory front side reading mode can be selected in consideration of a case where although the effective image is included on the reverse side of the original it is sufficient to transmit the image only on the front side. Accordingly, in a case where although the images are included on both sides of the original, it is sufficient to transmit the image only on the front side, the image data of only the necessary side of the original can be transmitted in the one-side mode by using the compulsory front side reading mode.

The present invention is not limited to the facsimile dedicated apparatus which has been shown and described above, but can be also applied to a facsimile apparatus of another type. For example, the invention can be also applied to such construction that an FAX modem is attached externally to or built in a general terminal such as a personal computer and facsimile communication is performed by a software control. In this case, a control program of the invention can be stored into not only the foregoing ROM 24 but also any computer-readable recording media such as hard disk, floppy disk, optical disk, magnetooptic disk, memory card, and the like and supplied.

As described above, according to the invention, in the facsimile apparatus for reading and transmitting both-side information, its control method, and a computer-readable memory medium in which its control program has been stored, there is used the construction for controlling the apparatus so that (1) whether the effective image data is included on both sides of the read original or not is discriminated, and (2) when at least one sheet of original in which the effective image data is included on both sides exists, the both-side transmission of the image data read out from both sides of the original is executed, and in the other cases, the one-side transmission of the image data read out from the front side of the original is executed. There are, consequently, the following excellent effects. That is, it is unnecessary that the user pays attention to a result of the discrimination about the both-side original or the one-side original. The troublesome operation to set the both-side/one-side transmission mode is unnecessary. Merely by setting the original and executing the transmitting operation, the proper both-side or one-side transmission mode can be automatically selected, the proper image data can be certainly transmitted, the failure in transmission can be prevented, and the image communication which the user desires can be properly executed.

Further, by using such construction that even if at least one sheet of original in which the effective image data is included on both sides exists, when the receiver on the partner side does not have the both-side transmission mode, only the sides including the effective image data are sequentially transmitted in order from first the front side and second the reverse side by using the one-side transmitting procedure, there is an excellent effect such that it is possible to communicate with the receiver which cannot perform the both-side transmission without any problems.

Moreover, by using such construction that (1) it is enabled to select the compulsory front side reading mode for reading only the image on the front side of the original, and (2) when the compulsory front side reading mode is selected, even if at least one sheet of original in which the effective image data is included on both sides exists, only the front side of the original is read out and the read image data is transmitted in the one-side mode; there can be provided an excellent effect such that in a case where although the image is included in both sides of the original, it is sufficient to transmit only the front side, only the image data of the necessary original sides can be transmitted in the one-side mode by using the compulsory front side reading mode.

What is claimed is:

1. A facsimile apparatus for reading image data of a both-side original and transmitting it, comprising:

reading means for reading images on both sides of the original;

storing means for storing all of the image data read by said reading means;

management data storing means for storing management data for management regarding front and reverse sides of the image data read by said reading means, with pairing of the front and reverse sides;

discriminating means for discriminating whether or not effective image data is included on both sides of the original read by said reading means; and selecting means for selecting one of a both-side transmission mode and a one-side transmitting mode on the basis of a discrimination result of said discriminating means, wherein said selecting means selects the both-side transmitting mode when at least one sheet of original in which the effective image data is included on the both sides exists, and selects the one-side transmitting mode in the other cases;

control means for notifying a partner side that a both-side transmission of the image data read from both sides of the original is to be executed, and transmitting all of the image data stored in said storage means, in a both-side transmitting mode, and for notifying the partner side that a one-side transmission of the image data read from a front side of the original is to be executed, and transmitting the image data in a one-side transmitting mode.

2. An apparatus according to claim 1, wherein even if at least one sheet of an original in which the effective image data is included on the both sides exists, when a receiver on the partner side does not have a both-side transmission mode, it is notified to the partner side that the one-side transmission is to be executed and only the sides including the effective image data are transmitted in order from the front side and a reverse side by using the one-side transmitting mode.

3. An apparatus according to claim 1, further comprising operating means for designating a compulsory front side reading mode for reading only the image on the front side of the original, wherein when said compulsory front side reading mode is selected by said operating means, during which only the front side of the original is read without the reverse side being read, the partner side is notified that the one-side transmission is to be executed and the read image data is transmitted in a one-side mode by using the one-side transmitting mode.

4. A control method of a facsimile apparatus for reading image data of a both-side original and transmitting it, comprising:

a storing step of storing image data read by said apparatus;

a management data storing step for storing management data for management regarding front and reverse sides of the image data read by said reading means, with pairing of the front and reverse sides;

a discriminating step of discriminating whether or not effective image data is included on both sides of the read original; and a selecting step for selecting one of a both-side transmission mode and a one-side transmitting mode on the basis of a discrimination result of said discriminating means, wherein said selecting step selects the both-side transmitting mode when at least one sheet of original in which the effective image data is included on the both sides exists, and selects the one-side transmitting mode in the other cases;

a control step of notifying a partner side that a both-side transmission of the image data read from both sides of the original is to be executed, and transmitting all of the image data stored in said storing step, in a both-side transmitting mode, and for notifying the partner side that a one-side transmission of the image data read from a front side of the original is to be executed, and transmitting the image data in a one-side transmitting mode.

5. A method according to claim 4, wherein even if at least one sheet of an original in which the effective image data is included on the both sides exists, when a receiver on the partner side does not have a both-side transmission mode, it is notified to the partner side that the one-side transmission is to be executed and only the sides including the effective image data are transmitted in order from the front side and a reverse side by using the one-side transmitting mode.

6. A method according to claim 4, wherein when a compulsory front side reading mode for reading only a image on the front side of the original is selected, during which only the front side of the original is read without the reverse side being read, the partner side is notified that the one-side transmission is to be executed and the read image data is transmitted in a one-side mode by using the one-side transmitting mode.

7. A computer-readable memory medium which stores a control program for a facsimile apparatus for reading image data of a both-side original and transmitting it, wherein said control program comprises:

a storing step of storing image data read from the original;

a management data storing step for storing management data for management regarding front and reverse sides of the image data read by said reading means, with pairing of the front and reverse sides;

a discriminating step of discriminating whether or not effective image data is included on both sides of the read original; and a selecting step for selecting one of a both-side transmission mode and a one-side transmitting mode on the basis of a discrimination result of said discriminating means, wherein said selecting step selects the both-side transmitting mode when at least one sheet of original in which the effective image data is included on the both sides exists, and selects the one-side transmitting mode in the other cases;

a control step of notifying a partner side that a both-side transmission of the image data read from both sides of the original is to be executed, and transmitting all of the image data stored in said storing step, in a both-side transmitting mode, and for notifying the partner side that a one-side transmission of the image data read from a front side of the original is to be executed, and transmitting the image data in a one-side transmitting mode.

8. A medium according to claim 7, wherein said medium stores a control procedure for notifying the partner side that the one-side transmission is to be executed and transmitting only the sides including the effective image data in order from the front side and a reverse side by using a one-side transmitting mode when a receiver on the partner side does not have a both-side transmission mode even if only one sheet of an original in which the effective image data is included on both sides exists.

9. A medium according to claim 7, wherein said medium stores a control procedure for reading only the front side of the original when a compulsory front side reading mode for reading only an image on the front side of the original is selected without the reverse side being read, and for notifying the partner side that the one-side transmission is to be executed, and transmitting the read image data in a one-side mode by using the one-side transmitting mode.

* * * * *